US012100173B2

(12) United States Patent
Bhutani et al.

(10) Patent No.: US 12,100,173 B2
(45) Date of Patent: Sep. 24, 2024

(54) METHOD AND SYSTEM FOR UNSUPERVISED PREDICTION OF IMAGE DEPTH AND CONFIDENCE MAP

(71) Applicant: Tata Consultancy Services Limited, Mumbai (IN)

(72) Inventors: Vishal Kumar Bhutani, Banaglore (IN); Madhu Babu Vankadari, Banaglore (IN); Anima Majumder Dutta, Banaglore (IN); Omprakash Manojkumar Jha, Banaglore (IN); Samrat Dutta, Banaglore (IN)

(73) Assignee: TATA CONSULTANCYSERVICES LIMITED, Mumbai (IN)

( * ) Notice: Subject to any disclaimer, the term of this patent is extended or adjusted under 35 U.S.C. 154(b) by 429 days.

(21) Appl. No.: 17/451,663

(22) Filed: Oct. 21, 2021

(65) Prior Publication Data
US 2022/0130062 A1 Apr. 28, 2022

(30) Foreign Application Priority Data
Oct. 24, 2020 (IN) .............................. 202021046429

(51) Int. Cl.
*G06T 7/593* (2017.01)
*G06N 3/08* (2023.01)
(Continued)

(52) U.S. Cl.
CPC .............. *G06T 7/593* (2017.01); *G06N 3/08* (2013.01); *G06N 5/04* (2013.01); *G06T 7/73* (2017.01);
(Continued)

(58) Field of Classification Search
CPC . G06T 7/593; G06T 7/73; G06T 2207/10012; G06T 2207/20081;
(Continued)

(56) References Cited

U.S. PATENT DOCUMENTS 9,165,199 B2 10/2015 Zhu et al.
2019/0244380 A1* 8/2019 Op Het Veld .......... G06T 7/593
(Continued)

OTHER PUBLICATIONS

Xin Yang et al., "Bayesian DeNet: Monocular Depth Prediction and Frame-wise Fusion with Synchronized Uncertainty", International Conference on Computer Vision (ICCV), Apr. 2019, vol. 21, Issue: 11, pp. 2701-2713, IEEE (Year: 2019).*
(Continued)

*Primary Examiner* — Matthew C Bella
*Assistant Examiner* — Janice E. Vaz
(74) *Attorney, Agent, or Firm* — FINNEGAN, HENDERSON, FARABOW, GARRETT & DUNNER, LLP

(57) ABSTRACT

Depth estimation of images using deep learning methods is a wide range of application in Augmented Reality, 3D graphics and robotics. Conventional methods are supervised, which requires explicit ground truth depth information for training and the conventional unsupervised methods fails to provide a generalized solution. The present disclosure estimates accurate depth information and confidence map of a given monocular image in an unsupervised manner. A depth Neural Network receives a monocular image and predicts per-pixel depth map and a confidence map. The depth NN utilizes a negative exponential of photometric loss as ground truth information. The predicted confidence-map is further used to estimate per-pixel uncertainty map. The pose NN predicts a plurality of pose vectors between a plurality of the consecutive monocular images. Finally, the Bayesian inference module is computes the fused depth information and the fused uncertainty map.

8 Claims, 5 Drawing Sheets

(51) Int. Cl.
  *G06N 5/04* (2023.01)
  *G06T 7/73* (2017.01)
(52) U.S. Cl.
  CPC .............. *G06T 2207/10012* (2013.01); *G06T 2207/20081* (2013.01); *G06T 2207/20084* (2013.01)
(58) Field of Classification Search
  CPC ........... G06T 2207/20084; G06T 2207/20076; G06N 3/08; G06N 5/04; H04N 13/128; H04N 2013/0081
  See application file for complete search history.

(56) References Cited

U.S. PATENT DOCUMENTS

| | | | |
|---|---|---|---|
| 2020/0160546 A1 | 5/2020 | Gu et al. | |
| 2021/0350616 A1* | 11/2021 | Guizilini | .................... G06T 7/20 |
| 2022/0101549 A1* | 3/2022 | Sadeghi | ................. G06V 20/58 |

OTHER PUBLICATIONS

Chuanxue Song et al., "Unsupervised Monocular Depth Estimation Method Based on Uncertainty Analysis and Retinex Algorithm", Sensors, Sep. 2020, vol. 20 (18), MDPI, https://www.mdpi.com/1424-8220/20/18/5389.

Mingyang Geng, "Unsupervised Learning-based Depth Estimation aided Visual SLAM Approach", Computer Vision and Pattern Recognition, Jan. 2019, Arxiv, https://arxiv.org/pdf/1901.07288.pdf.

Chao Zhou et al., "Unsupervised Learning of Stereo Matching", International Conference on Computer Vision (ICCV), Oct. 2017, IEEE, https://openaccess.thecvf.com/content_ICCV_2017/papers/Zhou_Unsupervised_Learning_of_ICCV_2017_paper.pdf.

Xin Yang et al., "Bayesian DeNet: Monocular Depth Prediction and Frame-wise Fusion with Synchronized Uncertainty", International Conference on Computer Vision (ICCV), Apr. 2019, vol. 21, Issue: 11, pp. 2701-2713, IEEE, https://mmc.committees.comsoc.org/files/2020/01/IEEE-ComSoc-MMTC-Comm-Review-Dec-2019.pdf.

* cited by examiner

METHOD AND SYSTEM FOR UNSUPERVISED PREDICTION OF IMAGE DEPTH AND CONFIDENCE MAP

PRIORITY CLAIM

This U.S. patent application claims priority under 35 U.S.C. § 119 to: India Application No. 202021046429, filed on Oct. 24, 2020. The entire contents of the aforementioned application are incorporated herein by reference.

TECHNICAL FIELD

The disclosure herein generally relates to the field of image processing and, more particular, to a method and system for unsupervised prediction of image depth and confidence map.

BACKGROUND

Depth estimation of Red Green Blue (RGB) images is an active field of research and it is having wide range of application in Augmented Reality, 3D graphics and robotics. Deep learning methods are providing better results compared to traditional methods, which use hand crafted features and exploit camera geometry and/or motion to estimate depth. The Deep learning methods are broadly classified into two categories like supervised or unsupervised.

Conventional methods are utilizing supervised methods and the supervised methods require explicit ground truth depth information obtained from range sensors for training. However, it is challenging to obtain explicit ground truth depth information in many real time applications. Hence there is a growing interest for unsupervised learning methods over the years aiming to overcome this limitation. However, the conventional unsupervised methods fails to provide a generalized solution since they rely on strong geometric constraints and hand-crafted features which is challenging to obtain.

SUMMARY

Embodiments of the present disclosure present technological improvements as solutions to one or more of the above-mentioned technical problems recognized by the inventors in conventional systems. For example, in one embodiment, a method for unsupervised prediction of image depth and confidence map is provided. The method includes receiving, by one or more hardware processors, a plurality of monocular images from an imaging device, wherein the plurality of monocular images includes consecutive image frames. The method includes predicting, by the one or more hardware processors a depth information and a confidence map based on a monocular image from the plurality of monocular images, wherein training the depth neural network includes the following steps: (i) receiving a rectified stereo image pair comprising a left image and a right image (ii) computing a plurality of disparity maps based on the rectified stereo image pair, wherein the plurality of disparity maps comprise a right to left disparity and a left to right disparity (iii) computing the depth information based on a plurality of parameters comprising a baseline distance of the rectified stereo image, a rectified camera focal length and the plurality of disparity maps (iv) reconstructing the received rectified stereo image pair based on the depth information, wherein the left image is reconstructed using the right image and the right to left disparity, wherein the right image is reconstructed using the left image and the left to right disparity (v) computing a photometric loss by comparing the reconstructed stereo image pair and the received rectified stereo image pair (vi) computing a negative exponential of the photometric loss, wherein the negative exponential provides a ground truth confidence information (vii) computing the confidence map based on the negative exponential, wherein a pixel with large photometric error maps to a smallest confidence value, wherein the pixel with small photometric error maps to a larger confidence value (viii) simultaneously computing natural log of the confidence map to obtain an uncertainty map associated with the confidence map and (ix) training the depth neural network based on the computed confidence map, the depth information and the plurality of disparity maps. The method further includes predicting, by the one or more hardware processors, a pose information associated with the plurality of monocular image sequences based on the depth information by a trained pose neural network. The method finally computes by the one or more hardware processors a fused data by combining the predicted data and a propagated data, wherein the fused data includes the combined depth map and the combined confidence map, wherein the predicted data comprising the predicted depth information, the uncertainty map and the pose information associated with the monocular image, by using Bayesian Inference model by: (i) receiving the propagated data associated with a previous frame, wherein the propagated data includes a propagated depth information and a propagated uncertainty map associated with the previous frame and (ii) combining the propagated data with the predicted data to obtain the fused data, wherein the predicted data of the current image frame is propagated to the next image frame.

In another aspect, a system for unsupervised prediction of image depth and confidence map is provided. The system includes at least one memory storing programmed instructions, one or more Input/Output (I/O) interfaces, and one or more hardware processors operatively coupled to the at least one memory, wherein the one or more hardware processors of the server machine are configured by the programmed instructions to receive a plurality of monocular images from an imaging device, wherein the plurality of monocular images includes consecutive image frames. Further, the one or more hardware processors of the server machine are configured by the programmed instructions to predict, by a trained depth neural network, a depth information and a confidence map based on a monocular image from the plurality of monocular images, wherein training the depth neural network includes: (i) receiving a rectified stereo image pair comprising a left image and a right image (ii) computing a plurality of disparity maps based on the rectified stereo image pair, wherein the plurality of disparity maps includes a right to left disparity and a left to right disparity (iii) computing the depth information based on a plurality of parameters comprising a baseline distance of the rectified stereo image, a rectified camera focal length and the plurality of disparity maps (iv) reconstructing the received rectified stereo image pair based on the depth information, wherein the left image is reconstructed using the right image and the right to left disparity, wherein the right image is reconstructed using the left image and the left to right disparity (v) computing a photometric loss by comparing the reconstructed stereo image pair and the received rectified stereo image pair (vi) computing a negative exponential of the photometric loss, wherein the negative exponential provides a ground truth confidence information (vii) computing the confidence map based on the negative exponential, wherein a pixel with large photometric error maps to a smallest confidence value, wherein the pixel with small photometric error maps to a larger confidence value (viii) simultaneously computing natural log of the confidence map to obtain an uncertainty map associated with the confidence map and (ix) training the depth neural network based on the computed confidence map, the depth information and the plurality of disparity maps. Furthermore, the one or more hardware processors of the server machine are configured by the programmed instructions to predict a pose information associated with the plurality of monocular image sequences based on the depth information by a trained pose neural network. Finally, the one or more hardware processors of the server machine are configured by the programmed instructions to compute a fused data by combining the predicted data and a propagated data, wherein the fused data includes the combined depth map and the combined confidence map, wherein the predicted data comprising the predicted depth information, the uncertainty map and the pose information associated with the monocular image, by using Bayesian Inference model by: (i) receiving the propagated data associated with a previous frame, wherein the propagated data includes a propagated depth information and a propagated uncertainty map associated with the previous frame and (ii) combining the propagated data with the predicted data to obtain the fused data, wherein the predicted data of the current image frame is propagated to the next image frame.

In yet another aspect, a computer program product including a non-transitory computer-readable medium having embodied therein a computer program for unsupervised prediction of image depth and confidence map is provided. The computer readable program, when executed on a computing device, causes the computing device to receive a plurality of monocular images from an imaging device, wherein the plurality of monocular images includes consecutive image frames. Further, The computer readable program, when executed on a computing device, causes the computing device to predict, by a trained depth neural network, a depth information and a confidence map based on a monocular image from the plurality of monocular images, wherein training the depth neural network includes: (i) receiving a rectified stereo image pair comprising a left image and a right image (ii) computing a plurality of disparity maps based on the rectified stereo image pair, wherein the plurality of disparity maps includes a right to left disparity and a left to right disparity (iii) computing the depth information based on a plurality of parameters comprising a baseline distance of the rectified stereo image, a rectified camera focal length and the plurality of disparity maps (iv) reconstructing the received rectified stereo image pair based on the depth information, wherein the left image is reconstructed using the right image and the right to left disparity, wherein the right image is reconstructed using the left image and the left to right disparity (v) computing a photometric loss by comparing the reconstructed stereo image pair and the received rectified stereo image pair (vi) computing a negative exponential of the photometric loss, wherein the negative exponential provides a ground truth confidence information (vii) computing the confidence map based on the negative exponential, wherein a pixel with large photometric error maps to a smallest confidence value, wherein the pixel with small photometric error maps to a larger confidence value (viii) simultaneously computing natural log of the confidence map to obtain an uncertainty map associated with the confidence map and (ix) training the depth neural network based on the computed confidence map, the depth information and the plurality of disparity maps. Furthermore, the computer readable program, when executed on a computing device, causes the computing device to predict a pose information associated with the plurality of monocular image sequences based on the depth information by a trained pose neural network. Finally, the computer readable program, when executed on a computing device, causes the computing device to compute a fused data by combining the predicted data and a propagated data, wherein the fused data includes the combined depth map and the combined confidence map, wherein the predicted data comprising the predicted depth information, the uncertainty map and the pose information associated with the monocular image, by using Bayesian Inference model by: (i) receiving the propagated data associated with a previous frame, wherein the propagated data includes a propagated depth information and a propagated uncertainty map associated with the previous frame and (ii) combining the propagated data with the predicted data to obtain the fused data, wherein the predicted data of the current image frame is propagated to the next image frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
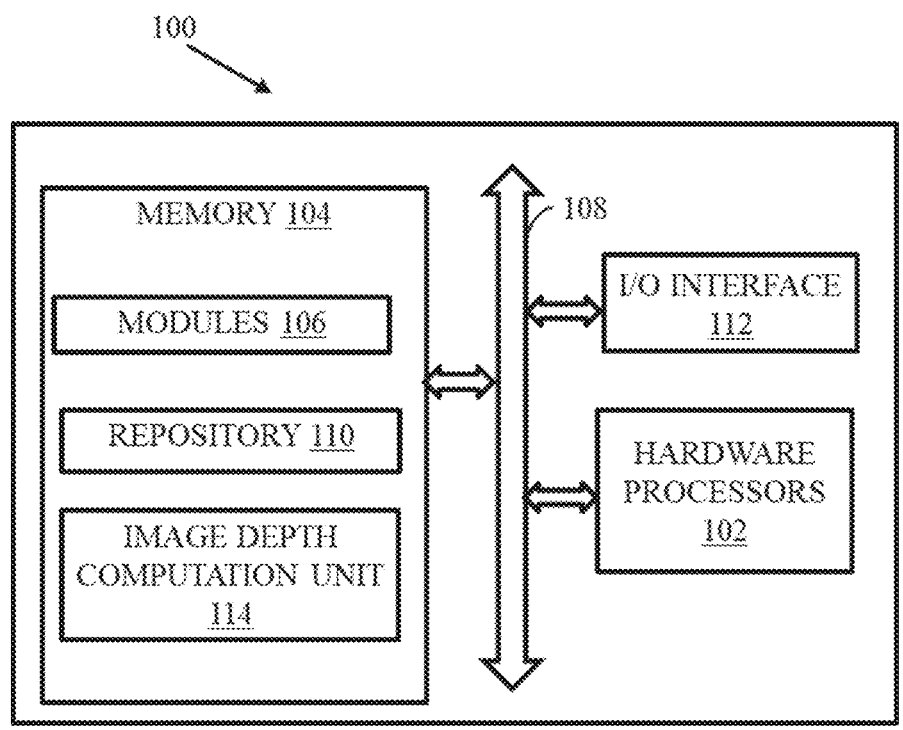
FIG. 1 is a functional block diagram of a system for unsupervised prediction of image depth and confidence map, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from scope of the disclosed embodiments.

Embodiments herein provide a method and system for unsupervised prediction of image depth and confidence map. The method and system estimates accurate depth information and confidence map of a given monocular image in an unsupervised manner. The method includes a depth Neural Network (NN), a pose NN and a Bayesian inference model.

The depth NN receives a monocular image as an input and predicts per-pixel depth map D and a confidence-map C. The predicted confidence-map C is further used to estimate per-pixel uncertainty map U. The pose NN receives a plurality of consecutive of monocular images and predicts a plurality of pose vectors between each of the plurality of the consecutive monocular images. Finally, the Bayesian inference module is designed to fuse a previous temporally aligned depth map with the depth map predicted using the depth NN and the plurality of pose vectors predicted by the pose NN to obtain the fused depth information and the fused uncertainty map.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a system 100 for unsupervised prediction of image depth and confidence map, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting a number of computing systems with one another or to another server computer. The VO interface 112 may include one or more ports for connecting a number of devices to one another or to another server. For example, the I/O interface connects an imaging device (not shown in FIG. 1) to the system 100.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106 and an image depth computation unit 114. The memory 104 also includes a data repository (or repository) 110 for storing data processed, received, and generated by the plurality of modules 106 and the image depth computation unit 114.

The plurality of modules 106 include programs or coded instructions that supplement applications or functions performed by the system 100 for Unsupervised prediction of image depth and confidence map. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for unsupervised prediction of image depth and confidence map.

The data repository (or repository) 110 may include a plurality of abstracted piece of code for refinement and data that is processed, received, or generated as a result of the execution of the plurality of modules in the module(s) 106 and the modules associated with the image depth computation unit 114. In an embodiment, the depth NN, the pose NN and the Bayesian inference model is present inside the image depth computation unit 114. The data repository may also include the plurality of images used for training and testing the depth NN, the pose NN and the Bayesian inference model associated with the method for unsupervised prediction of image depth and confidence map.

Although the data repository 110 is shown internal to the system 100, it will be noted that, in alternate embodiments, the data repository 110 can also be implemented external to the system 100, where the data repository 110 may be stored within a database (not shown in FIG. 1) communicatively coupled to the system 100. The data contained within such external database may be periodically updated. For example, new data may be added into the database (not shown in FIG. 1) and/or existing data may be modified and/or non-useful data may be deleted from the database (not shown in FIG. 1). In one example, the data may be stored in an external system, such as a Lightweight Directory Access Protocol (LDAP) directory and a Relational Database Management System (RDBMS).

Figure 2A:
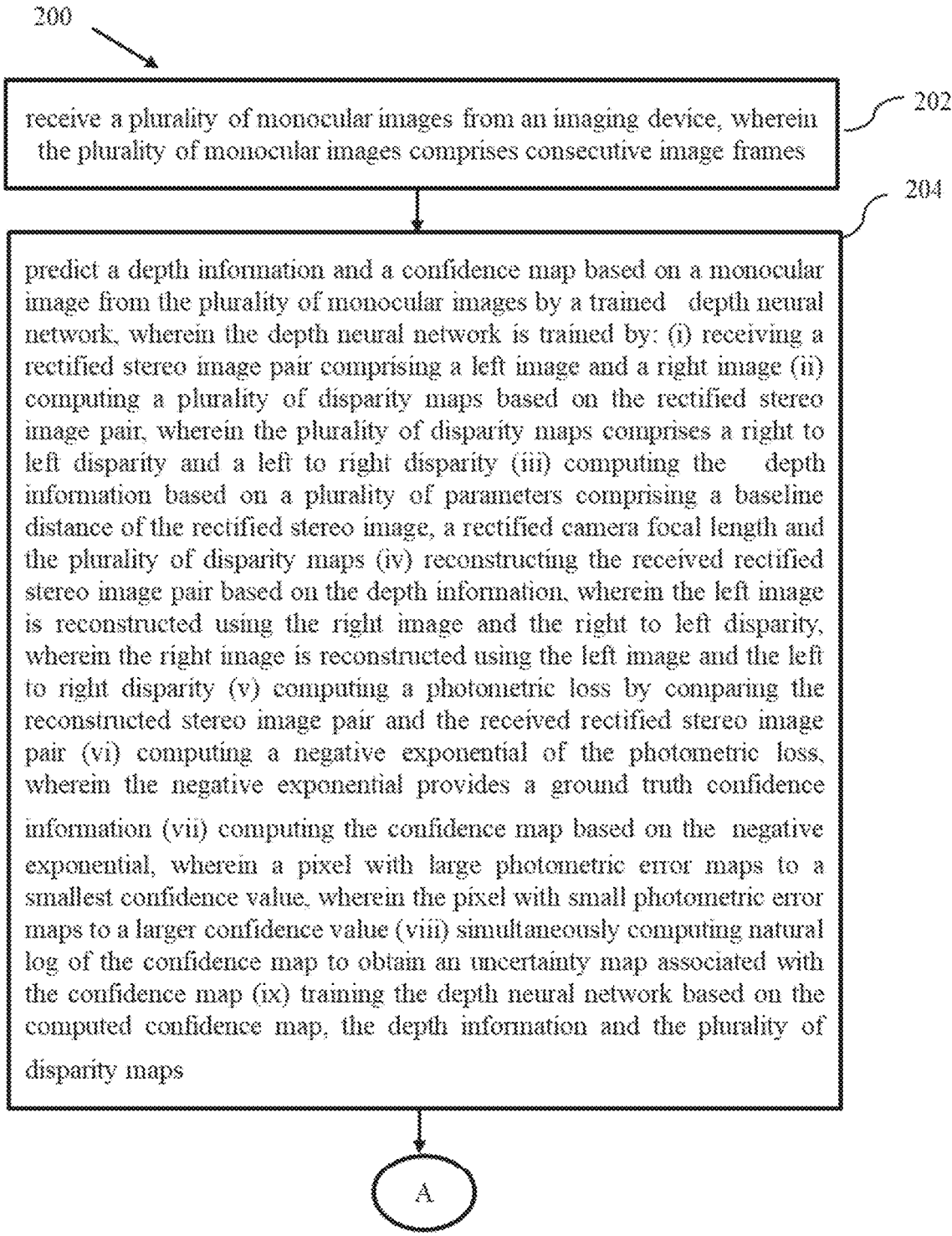
FIGS. 2A and 2B are exemplary flow diagrams for a method for unsupervised prediction of image depth and confidence map implemented by the system of FIG. 1, in accordance with some embodiments of the present disclosure.
Figure 2B:
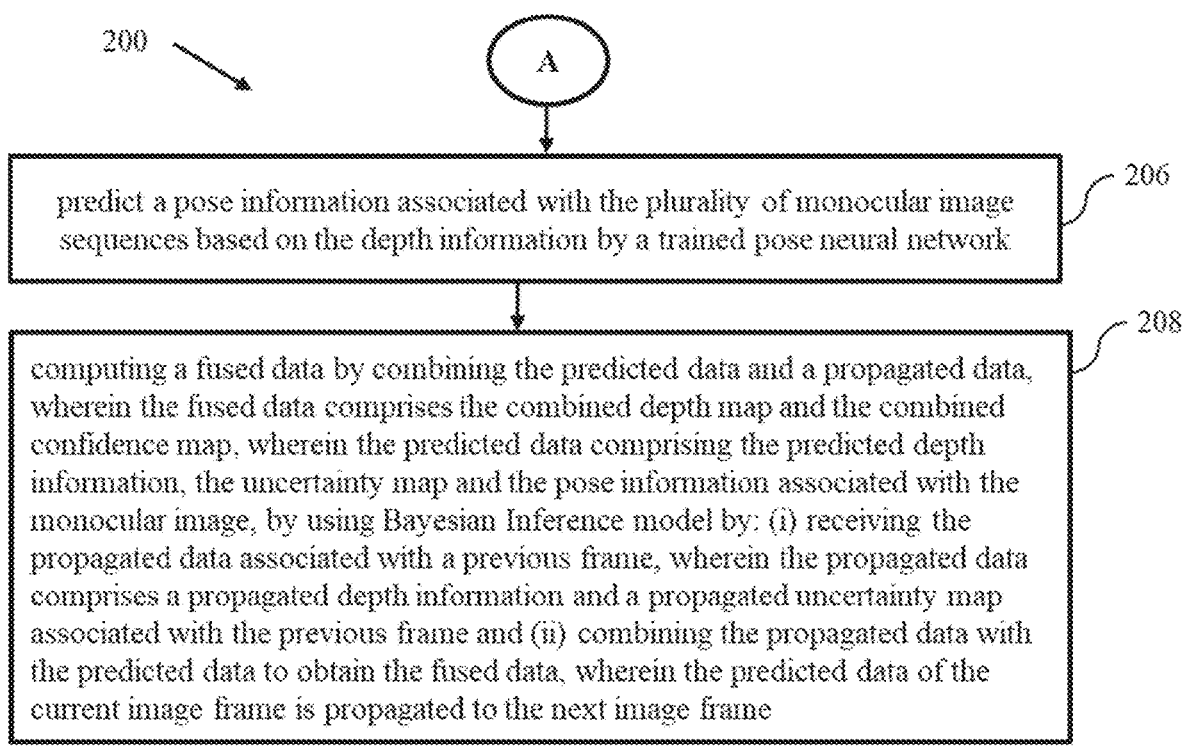

FIGS. 2A and 2B are exemplary flow diagrams for a processor implemented method for unsupervised prediction of image depth and confidence map implemented by the system of FIG. 1A and FIG. 18 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2A and FIG. 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 108 receive a plurality of monocular images from an imaging device. The plurality of monocular images includes consecutive image frames.

At 204 of the method 200, the one or more hardware processors 108 predict a depth information and a confidence map based on a monocular image from the plurality of monocular images by a trained depth NN.

In an embodiment, the depth NN is trained by the following steps: Initially, the depth NN receives a rectified stereo image pair comprising a left image and a right image. Further, a plurality of disparity maps and confidence map are computed based on the rectified stereo image pair. The plurality of disparity maps includes a right to left disparity and a left to right disparity. The depth information is computed based on a plurality of parameters comprising a baseline distance of the rectified stereo image, a rectified camera focal length and the plurality of disparity maps. Further, the received rectified stereo image pair is reconstructed based on the depth information. The left image is reconstructed using the right image and the right to left disparity. The right image is reconstructed using the left image and the left to right disparity. Further, a photometric loss is computed by comparing the reconstructed stereo image pair and the received rectified stereo image pair. A negative exponential of the photometric loss is computed. The negative exponential provides a ground truth confidence information. Further, the confidence loss is estimated by comparing ground-truth confidence and network predicted confidence. The pixel with large photometric error maps to a smallest confidence value. The pixel with small photometric error maps to a larger confidence value. Simultaneously, natural log of the confidence map is computed to obtain an uncertainty map associated with the confidence map. The depth NN is trained based on the computed confidence map, the depth information and the plurality of disparity maps.

At 206 of the method 200, the one or more hardware processors 108 predict a pose information associated with the plurality of monocular image sequences based on the depth information by a trained pose neural network.

In an embodiment, the pose NN is trained as follows: Initially, the pose NN receives a plurality of consecutive monocular images from an imaging device. Further, the pose NN computes a plurality of pose vectors based on the plurality of consecutive monocular images. The plurality of pose vectors includes translation and rotation information of the imaging device. Further, the plurality of consecutive monocular images are reconstructed based on the corresponding depth information and the plurality of pose vectors. The depth information is computed using the depth neural network. Further, a temporal loss information is computed by comparing the plurality of reconstructed consecutive monocular images and the plurality of received consecutive monocular images and the pose neural network is trained based on the computed loss information.

At 208 of the method 200, the one or more hardware processors 108 compute a fused data by combining the predicted data and a propagated data by using Bayesian Inference model. The fused data includes the combined depth map and the combined confidence map. The predicted data comprising the predicted depth information, the uncertainty map and the pose information associated with the monocular image. The method of computing the fused data includes steps of: (i) receiving the propagated data associated with a previous image frame. The propagated data includes a propagated depth information and a propagated uncertainty map associated with the previous image frame and (ii) combining the propagated data with the predicted data to obtain the fused data. The predicted data of the current image frame is propagated to the next image frame.

Figure 3:
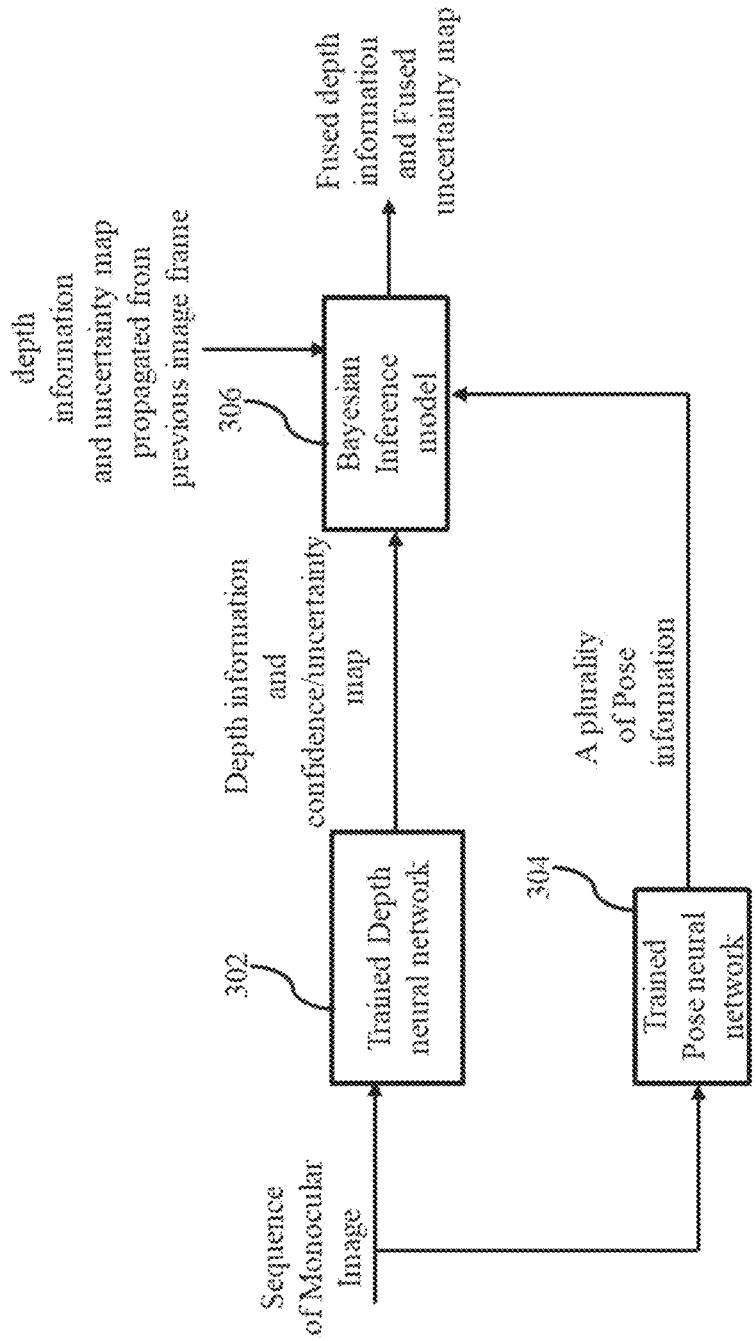
FIG. 3 illustrates an overall architecture illustrating the method for unsupervised prediction of image depth and confidence map, in accordance with some embodiments of the present disclosure.

FIG. 3 illustrates an overall architecture illustrating the method for unsupervised prediction of image depth and confidence map, in accordance with some embodiments of the present disclosure.

Now referring to FIG. 3, the trained depth NN 302 receives the monocular image and computes the depth information and the confidence map. Further, the trained pose NN 304 receives the depth information, the plurality of consecutive monocular images and computes the plurality of pose information. Further, the Bayesian inference model 306 receives depth information and confidence map propagated from previous image frame and computes the fused depth information and the fused confidence map.

In an embodiment, the trained depth NN 302 predicts a correspondence-map between the left image and the right image i.e., disparity map d to obtain the depth. In an embodiment, the trained depth NN is trained as follows. During training, the disparity NN receives a rectified stereo image pair $\{l_l, I_r\}$. A disparity function associated with the disparity NN receives the left image $I_l$ and predicts a dense correspondence maps $d_{rl}$ (right-to-left disparity) and $d_{lr}$ (left-to-right disparity). The predicted disparities are then used to reconstruct the stereo images. The left image is reconstructed using the right image $l_r$ and left-to-right disparity $d_{lr}$. Similarly, right image is also reconstructed using left image $l_l$ and right-to-left disparity $d_{rl}$. The depth map D can be calculated as D=bf/d, where, b is the baseline distance of the stereo rig, f is the rectified camera focal length and $d=d_{lr}$ is the predicted disparity. These estimated left $l'_l$ and right $l'_r$ are compared against the original left and right images to calculate the photo-metric losses required for training the network. Since the model takes only left image as input, it can work as a monocular-depth estimation network during the inference time.

In an embodiment, the disparity NN is a fully convolutional encoder-decoder style network with four output layers. Each of the output layer predicts two disparity maps (left-right and right-left disparities) and the confidence map. The predicted disparities are normalized to have maximum value as 30% of input image width using a sigmoid activation function and the confidence values are normalized to be between 0 and 1. There are multiple skip-connections attached to different stages of decoder from the encoder in-order to facilitate the exchange of low-dimensional information while estimating disparity and confidence maps.

In an embodiment, the confidence map C is predicted by the depth NN lie between [0,1] where, higher the confidence value signifies network is much more certain about its predictions and correspondingly for the lower confidence value. A negative exponential of the photo-metric error calculated using the reconstructed left and right images as shown in Equation 1. The negative exponential is utilized as a ground truth depth information. Hence, a pixel having large photometric error will map to a smaller confidence value and pixel having small photo-metric error will map to a larger confidence value. The motivation behind this comes from the fact that the accuracy of the estimated disparity defines the reconstruction quality of the image. In other words, if the predicted disparity is accurate, the images will get reconstructed accurately and the error between the original and reconstructed image will be small. Mathematically, the ground-truth confidence is calculated as given in equation 1:

$$C_g = e^{-|I_t - I'_l|} + e^{-|I_r - I'_r|} \quad (1)$$

It is assumed that the depth measurement of a pixel (u,v) belongs to a normal distribution with a mean D(u,v) and variance $\sigma^2$. The per-pixel uncertainty-map U is obtained using the predicted confidence C as $\sigma^2 = \ln^2(C) = U$.

In an embodiment, appearance loss is calculated between the reconstructed images obtained from the spatial and temporal reconstruction modules and their respective original images. This loss function makes sure the that the reconstructed images and their original images are same in all the aspects such as color and structure. Two metrics namely, L1 and Structural Similarity Index (SSIM) are used to calculate this loss. The convex combination of these two metrics is referred as appearance or photo-metric loss and mathematically, it can be written as given in equation 2.

$$L_{ap} = \frac{1}{N}\sum_{ij}\frac{\alpha}{2}\tilde{p}(1 - SSIM(I_{ij}, I'_{ij})) + (1-\alpha)\tilde{p}(I_{ij} - I'_{ij}) \quad (2)$$

where, I'l$_t$,I'$_r$,I'$_t$ and l is its respective original image. $\alpha$=0.85 is a weighted factor, and $\tilde{p}$ is the charbonnier penalty function.

In an embodiment, smoothness loss encourages the predicted disparities to be locally smooth between the strong gradient regions like edges to preserve the spatial layout of the scene. To achieve this, the disparity gradients $\partial d$ are weighted with negative exponential image gradients $\partial l$ and the same can be mathematically written as given in equation 3:

$$L_{ds} = \frac{1}{N}\sum_{ij}\tilde{p}(\partial_x d_{ij} e^{-|\partial_x l_{ij}|}) + \tilde{p}(\partial_y d_{ij} e^{-|\partial_y l_{ij}|}) \quad (3)$$

where, d∈(d$_{lr}$,d$_{rl}$) and l∈(I$_l$,I$_r$) respectively.

In an embodiment, the trained depth NN predicts two (left-right and right-left) disparity-maps. The left-right consistency loss enforces the cycle-consistency constraint between the predicted disparities by predicting left-right disparity from right-left disparity and vice versa. This loss makes the predicted disparities to be coherent with each other and improves the overall performance. The loss is calculated for both the disparities. The loss with left-right disparity can be mathematically written as given in equation 4.

$$L_{lr}^l = \frac{1}{N}\sum_{ij}\left|d_l^{ij} - d_r^{ij+d_l^{ij}}\right| \quad (4)$$

In an embodiment, a confidence loss is calculated as $L_1$ difference between the ground-truth and predicted confidences. As the direct ground-truth confidence is not available, the present disclosure utilizes the confidence map calculated based on the equation 1 as a reference. The loss can be defined as given in equation 5:

$$L_{cl} = \Sigma_{ij}C_{ij} - (C_g)_{ij} \quad (5)$$

The total loss function $L_{total}$ combines all the aforesaid loss functions and it can be written as given in equation 6:

$$L = \mu_1 L_{ap} + \mu_2 L_{ds} + \mu_3 L_{lr} + \mu_4 L_{cl} \quad (6)$$

where, $L_{ap} = L_{ap}^d + L_{ap}^p$ is the appearance loss calculated with the disparity $L_{ap}^d$ and predicted poses $L_{ap}^p$. $L_{ds} = L_{ds}^l + L_{ds}^r$ is disparity smoothness loss, $L_{lr} = L_{lr}^l + L_{lr}^r$
is left-right consistency loss and $L_{cl} = L_{cl}^l + L_{cl}^r$ is confidence loss. The $\mu$'s are weight coefficients given to each loss.

In an embodiment, the trained pose NN 304 is trained as follows: Given a pair of consecutive monocular images, the trained pose NN predicts 6-DOF ego-motion of the camera between them. For instance, given a pair of images (I$_{t-1}$,I$_t$) from either left or right camera, the pose NN predicts a vector $P_t^{t-1}$ comprising of translation (t$_x$, t$_y$, t$_z$) and rotation ($\rho$, $\theta$, $\psi$) of the camera between the frames. The predicted pose information $P_t^{t-1}$ and the depth of the t-th frame D$_t$ is used to reconstruct the I$_t$ using a temporal reconstruction module from I$_{t-1}$. The reconstructed image I'$_t$ is compared against the original I$_t$ to calculate the losses necessary for the training.

In an embodiment, the trained pose NN is composed of a convolutional encoder followed by two fully connected layers that output a 6-DOF pose vectors for a given pair of images. Relu is used as an activation function in both of the networks except in the output layers. The outputs of the trained pose NN are not processed through any activation.

In an embodiment, the Bayesian inference model computes a fused depth map and the fused confidence map using the previous depth maps, the predicted confidence map and the predicted depth map. Given a pair of estimated depth-maps D$_{t-1}$,D$_t$, uncertainty-maps U$_{t-1}$,U$_t$, and the transformation between the frames $P_t^{t-1} = [R \cdot T]P_t^{t-1} = [R,T]$, a pixel (u,v, 1)$^T$ in depth-map D$_{t-1}$ can be propagated into D$_t$ as given in equation 7 and 8.

$$P = K^{-1}(u,v,1)^T \quad (7)$$

$$D_t^p(u^0,v^0) = K[RD_{t-1}(u,v)P + T] \quad (8)$$

In the same way, the uncertainty map is also propagated from t−1 to t-th frame as given in equation 9.

$$U_t^p = JU_{t-1}J^T \quad (9)$$

where, $$J = \frac{\partial D_y^p}{\partial D_{t-1}}$$

and it is mathematically difficult to calculate due to the non-linear relationship between $D_t^p$ and $D_{t-1}$. For simplicity and efficiency, it is assumed that the change in rotation of the camera between two consecutive frames is very small which is often the case in real-world and hence, the rotation matrix R can be replaced with an identity matrix. With this assumption, the $D_t^p$ and $U_t^p$ can be written as given in equation 10 and 11 respectively.

$$D_t^p = D_{t-1} + T_Z \quad (10)$$

$$U_t^p \approx T_Z + \sigma_w^2 \quad (11)$$

where $T_Z$ is the translation of the camera in z-direction and $\sigma_w^2$ is white Gaussian noise with mean zero and variance of $\sigma^2$. The noise is added to supplant the inherent noises that are present in the pose-estimation.

The predicted depth map $D_t$ and uncertainty map $U_t$ at time t, are fused with the propagated depth map $D_t^p$ and uncertainty map $U_t^p$ to get a final fused depth map $D_t^f$ and uncertainty map $U_t^f$. The detailed overview of the proposed method is depicted in FIG. 2. Using the Bayesian inference, the fused depth is defined as given in equation 12:

$$P(D_t^f \mid D_t) = \frac{P(D_t \mid D_t^p) P(D_t^p)}{P(D_t)} \quad (12)$$

Probability of the propagated depth is represented by prior probability $P(D_t^p)$ and the probability of the predicted depth is represented by the likelihood $P(D_t \mid D_t^p)$. Based on the assumption that the depth measurement of a pixel belongs to a normal distribution as given in equation 13 and 14, $P(D_t \mid D_t^p) \sim N(D_t, U_t), P(D_t^p) \sim N(N(D_t^p, U_t^p), P(D_t)$ is constant and $P(D_t^f \mid D_t) \sim N(D_t^f, U_t^f)$.

$$P(D_t^f \mid D_t) \propto \frac{1}{\sqrt{2\pi U_L}} \exp\left(-\frac{(x-D_t)^2}{2U_t}\right) * \frac{1}{\sqrt{2\pi U_t^p}} \exp\left(-\frac{(x-D_t^p)^2}{2U_t^p}\right) \quad (13)$$

$$P(D_t^f \mid D_t) \propto \frac{1}{\sqrt{2\pi U_t^f}} \exp\left(-\frac{(x-D_t^f)^2}{2U_t^f}\right) \quad (14)$$

Using equation (7) and (8) the fused depth and uncertainty maps at time t can be written as $$D_t^f = \frac{(D_t^p U_t) + (D_t U_t^p)}{U_t^p + U_t} \text{ and } U_t^f = \frac{U_t^p U_t}{U_t^p + U_t}.$$

However, it is important to note that the assumptions of Jacobian and rotation matrices fail when there is a large camera rotation between the consecutive image frames and hence the Bayesian fusion cannot be used.

Further, the image depth computation unit 114, when executed by one or more processors of the system 100, receive the plurality of monocular images from the imaging device. The plurality of monocular images includes consecutive image frames.

Further, the image depth computation unit 114, when executed by one or more processors of the system 100 predicts the depth information and the confidence map based on the monocular image from the plurality of monocular images by the trained depth NN.

In an embodiment, the depth NN is trained by the following steps: Initially, the depth NN receives the rectified stereo image pair including the left image and the right image. Further, the plurality of disparity maps are computed based on the rectified stereo image pair. The plurality of disparity maps includes the right to left disparity and the left to right disparity. The depth information is computed based on the plurality of parameters comprising the baseline distance of the rectified stereo image, the rectified camera focal length and the plurality of disparity maps. Further, the received rectified stereo image pair is reconstructed based on the depth information. The left image is reconstructed using the right image and the right to left disparity. The right image is reconstructed using the left image and the left to right disparity. Further, the photometric loss is computed by comparing the reconstructed stereo image pair and the received rectified stereo image pair. the negative exponential of the photometric loss is computed. The negative exponential provides the ground truth confidence information. Further, the confidence map is computed based on the negative exponential. The pixel with large photometric error maps to the smallest confidence value. The pixel with small photometric error maps to the larger confidence value. Simultaneously, natural log of the confidence map is computed to obtain the uncertainty map associated with the confidence map. The depth NN is trained based on the computed confidence map, the depth information and the plurality of disparity maps.

Further, the image depth computation unit 114, when executed by one or more processors of the system 100 predicts the pose information associated with the plurality of monocular image sequences based on the depth information by the trained pose neural network.

In an embodiment, the pose NN is trained as follows: Initially, the pose NN receives the plurality of consecutive monocular images from the imaging device. Further, the pose NN computes the plurality of pose vectors based on the plurality of consecutive monocular images. The plurality of pose vectors includes translation and rotation information of the imaging device. Further, the plurality of consecutive monocular images are reconstructing based on the corresponding depth information and the plurality of pose vectors. The depth information is computed using the depth neural network. Further, the temporal loss information is computed by comparing the plurality of reconstructed consecutive monocular images and the plurality of received consecutive monocular images and the pose neural network is trained based on the computed loss information.

Further, the image depth computation unit 114, when executed by one or more processors of the system 100 computes the fused data by combining the predicted data and the propagated data by using Bayesian inference model. The fused data includes the combined depth map and the combined confidence map. The predicted data includes the predicted depth information, the uncertainty map and the pose information associated with the monocular image. The method of computing the fused data is: (i) receiving the propagated data associated with the previous image frame. The propagated data includes the propagated depth information and the propagated uncertainty map associated with the previous image frame and (ii) combining the propagated data with the predicted data to obtain the fused data. The predicted data of the current image frame is propagated to the next image frame.

Figure 4:
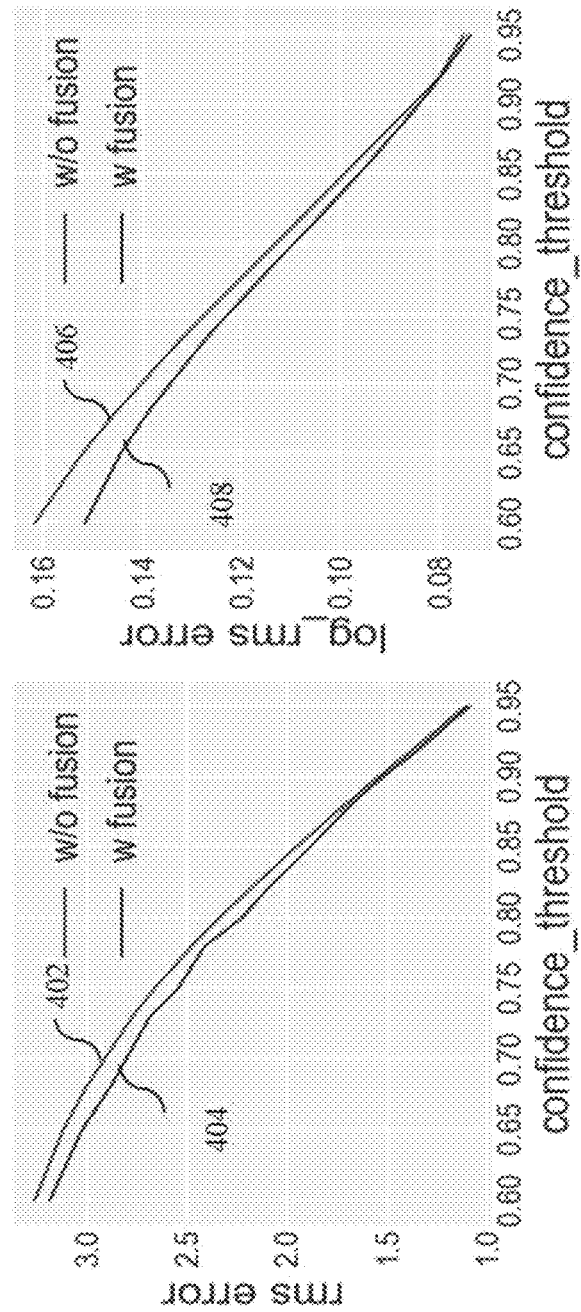
FIG. 4 illustrates an average Root Mean Square (RMS) and Log RMS error plots for depth estimation on a continuous sequence of images taken from standard dataset, in accordance with some embodiments of the present disclosure.

FIG. 4 illustrates an average Root Mean Square (RMS) and Log RMS error plots for depth estimation on a continuous sequence of images taken from KITTI dataset, in accordance with some embodiments of the present disclosure. Now, referring to FIG. 4, the plot 402 illustrates the RMS error without fusion using Bayesian inference model and the plot 404 illustrates the RMS error with fusion using Bayesian inference model. Similarly, the plot 406 illustrates the Log RMS error without fusion using Bayesian inference model and the plot 404 illustrates the Log RMS error with fusion using Bayesian inference model. It is observed that the RMS and Log RMS error is minimized when the depth information and confidence map fusion is performed using the Bayesian inference model.

In an embodiment, the present disclosure is experimented as follows: In an embodiment, the input image resolution is set to 256×512 and the batch size is set to 4. The loss function is set with $\beta_1=0.9$, $\beta2=0.99$. The initial learning rate is set to 1e$^{-04}$. It gets reduced by half after completing $(3/5)^{th}$ of total iteration and further reduced by half after completing $(4/5)^{th}$ of the total number of iterations. The weights $\mu_1$, $\mu_2$, $\mu_3$ and $\mu_4$ in the loss function are set to 1.0 and $\mu_2$ to 0.1. Data augmentation is used to reduce the possibility of over fitting which include change in brightness, change in saturation and change in gamma in a range of [0.5,2.0], [0.8, 1.2] and [0.8,1.2] respectively. In the following subsections, details about both qualitative and quantitative evaluation on KITTI and Indoor Datasets are given.

KITTI-Dataset: KITTI is a popular outdoor driving dataset to benchmark the efficacy of the depth-estimation methods in this domain. It is comprised of 61 different outdoor driving sequences with 42,382 images of resolution 1242×345. As per the literature, the dataset is divided into two splits, namely kitti-split and eigen-split which are commonly used for evaluating the depth estimation accuracy. The performance of the proposed method is demonstrated using the eigen-split for a fair comparison with the state-of-the-art methods.

In an embodiment, the predicted depth information and confidence map predicted can be used for pick and place operation. To further demonstrate the usability of the estimated depth and confidence maps in the real-world applications, a pick-and-place task is performed using an industrial manipulator. The dataset of 22K images with a resolution of 720×1280 having 5 different object configurations using a ZED-Mini stereo camera. The estimated depth-maps, confidence maps and 3D reconstructed point clouds. One can observe that the proposed method is able to generate plausible depth maps and retain most of the structural attributes of the objects. The reconstructed point clouds are further processed using the region-growing algorithm to estimate a possible position for picking the object. Once the picking position is known, the manipulator plans the trajectory to carry out the picking operation to a pre-defined placing point.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of computing robust depth information and confidence map. The present disclosure provides the unsupervised method for estimating the depth information and the confidence map in an accurate manner. The confidence map is computed based on the negative exponential of the photometric loss. The negative exponential of the photometric loss is used as the ground truth confidence information. Further, the present disclosure fuses the predicted depth and uncertainty information with the propagated depth information and confidence information which provides more accurate computation of depth and confidence information. Further, the present disclosure is efficient in computing the depth information in the images captured in indoor environment.

It is to be understood that the scope of the protection is extended to such a program and in addition to a computer-readable means having a message therein such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:
receiving, by one or more hardware processors, a plurality of monocular images from an imaging device, wherein the plurality of monocular images comprises consecutive image frames;
predicting, by a trained depth neural network executed by via the one or more hardware processors, a depth information and a confidence map based on a monocular image from the plurality of monocular images, wherein training the depth neural network comprises:
receiving a rectified stereo image pair comprising a left image and a right image;
computing a plurality of disparity maps based on the rectified stereo image pair, wherein the plurality of disparity maps comprises a right to left disparity and a left to right disparity;
computing the depth information based on a plurality of parameters comprising a baseline distance of the rectified stereo image, a rectified camera focal length and the plurality of disparity maps;
reconstructing the received rectified stereo image pair based on the depth information, wherein the left image is reconstructed using the right image and the right to left disparity and wherein the right image is reconstructed using the left image and the left to right disparity;
computing a photometric loss by comparing the reconstructed stereo image pair and the received rectified stereo image pair;
computing a negative exponential of the photometric loss, wherein the negative exponential provides a ground truth confidence information;
computing the confidence map based on the negative exponential, wherein a pixel with large photometric error maps to a smallest confidence value;
simultaneously computing natural log of the confidence map to obtain an uncertainty map associated with the confidence map; and
training the depth neural network based on the computed confidence map, the depth information, and the plurality of disparity maps;
predicting, by a trained pose neural network executed by via the one or more hardware processors, a pose information associated with the plurality of monocular image sequences based on the depth information learnt by the trained pose neural network, wherein training the pose neural network comprises:
receiving a plurality of consecutive monocular images from the imaging device;
computing a plurality of pose vectors based on the plurality of consecutive monocular images;
reconstructing the plurality of consecutive monocular images based on the depth information and the plurality of pose vectors, wherein the corresponding depth information is computed using the depth neural network;
computing a temporal loss information by comparing the plurality of reconstructed consecutive monocular images and the plurality of received consecutive monocular images; and
training the pose neural network based on the computed loss information; and
computing, by the one or more hardware processors, a fused data by combining the predicted data and a propagated data, wherein the fused data comprises a combined depth map and a combined confidence map, wherein the predicted data comprising the predicted depth information, the uncertainty map and the pose information associated with the monocular image, by using Bayesian Inference model by:
receiving the propagated data associated with a previous frame, wherein the propagated data comprises a propagated depth information and a propagated uncertainty map associated with the previous frame; and
combining the propagated data with the predicted data to obtain the fused data, wherein the predicted data of the current image frame is propagated to the next image frame.

2. The method of claim 1, wherein the plurality of pose vectors comprises translation and rotation information of the imaging device.

3. A system comprising:
at least one memory storing programmed instructions; one or more Input/Output (I/O) interfaces; and one or more hardware processors operatively coupled to the at least one memory, wherein the one or more hardware processors are configured by the programmed instructions to:
receive a plurality of monocular images from an imaging device, wherein the plurality of monocular images comprises consecutive image frames;
predict, by a trained depth neural network, a depth information and a confidence map based on a monocular image from the plurality of monocular images, wherein training the depth neural network comprises:
receiving a rectified stereo image pair comprising a left image and a right image;
computing a plurality of disparity maps based on the rectified stereo image pair, wherein the plurality of disparity maps comprises a right to left disparity and a left to right disparity;
computing the depth information based on a plurality of parameters comprising a baseline distance of the rectified stereo image, a rectified camera focal length and the plurality of disparity maps;
reconstructing the received rectified stereo image pair based on the depth information, wherein the left image is reconstructed using the right image and the right to left disparity and wherein the right image is reconstructed using the left image and the left to right disparity;
computing a photometric loss by comparing the reconstructed stereo image pair and the received rectified stereo image pair;
computing a negative exponential of the photometric loss, wherein the negative exponential provides a ground truth confidence information;
computing the confidence map based on the negative exponential;

simultaneously computing natural log of the confidence map to obtain an uncertainty map associated with the confidence map; and training the depth neural network based on the computed confidence map, the depth information and the plurality of disparity maps;

predict a pose information associated with the plurality of monocular image sequences based on the depth information by a trained pose neural network, wherein training the pose neural network comprises:

receiving a plurality of consecutive monocular images from the imaging device;

computing a plurality of pose vectors based on the plurality of consecutive monocular images;

reconstructing the plurality of consecutive monocular images based on the depth information and the plurality of pose vectors, wherein the corresponding depth information is computed using the depth neural network;

computing a temporal loss information by comparing the plurality of reconstructed consecutive monocular images and the plurality of received consecutive monocular images; and training the pose neural network based on the computed loss information; and compute a fused data by combining the predicted data and a propagated data, wherein the fused data comprises a combined depth map and a combined confidence map, wherein the predicted data comprising the predicted depth information, the uncertainty map and the pose information associated with the monocular image, by using Bayesian Inference model by:

receiving the propagated data associated with a previous frame, wherein the propagated data comprises a propagated depth information and a propagated uncertainty map associated with the previous frame; and combining the propagated data with the predicted data to obtain the fused data, wherein the predicted data of the current image frame is propagated to the next image frame.

4. The system of claim 3, wherein the plurality of pose vectors comprises translation and rotation information of the imaging device.

5. One or more non-transitory machine readable information storage mediums comprising one or more instructions which when executed by one or more hardware processors causes:

receiving, by one or more hardware processors, a plurality of monocular images from an imaging device, wherein the plurality of monocular images comprises consecutive image frames;

predicting, by a trained depth neural network executed by via the one or more hardware processors, a depth information and a confidence map based on a monocular image from the plurality of monocular images, wherein training the depth neural network comprises:

receiving a rectified stereo image pair comprising a left image and a right image;

computing a plurality of disparity maps based on the rectified stereo image pair, wherein the plurality of disparity maps comprises a right to left disparity and a left to right disparity;

computing the depth information based on a plurality of parameters comprising a baseline distance of the rectified stereo image, a rectified camera focal length and the plurality of disparity maps;

reconstructing the received rectified stereo image pair based on the depth information, wherein the left image is reconstructed using the right image and the right to left disparity and wherein the right image is reconstructed using the left image and the left to right disparity;

computing a photometric loss by comparing the reconstructed stereo image pair and the received rectified stereo image pair;

computing a negative exponential of the photometric loss, wherein the negative exponential provides a ground truth confidence information;

computing the confidence map based on the negative exponential;

simultaneously computing natural log of the confidence map to obtain an uncertainty map associated with the confidence map; and training the depth neural network based on the computed confidence map, the depth information and the plurality of disparity maps;

predicting, by a trained pose neural network executed by via the one or more hardware processors, a pose information associated with the plurality of monocular image sequences based on the depth information by a trained pose neural network, wherein training the pose neural network comprises:

receiving a plurality of consecutive monocular images from the imaging device;

computing a plurality of pose vectors based on the plurality of consecutive monocular images;

reconstructing the plurality of consecutive monocular images based on the depth information and the plurality of pose vectors, wherein the corresponding depth information is computed using the depth neural network;

computing a temporal loss information by comparing the plurality of reconstructed consecutive monocular images and the plurality of received consecutive monocular images; and training the pose neural network based on the computed loss information; and computing, by the one or more hardware processors, a fused data by combining the predicted data and a propagated data, wherein the fused data comprises a combined depth map and a combined confidence map, wherein the predicted data comprising the predicted depth information, the uncertainty map and the pose information associated with the monocular image, by using Bayesian Inference model by:

receiving the propagated data associated with a previous frame, wherein the propagated data comprises a propagated depth information and a propagated uncertainty map associated with the previous frame; and combining the propagated data with the predicted data to obtain the fused data, wherein the predicted data of the current image frame is propagated to the next image frame.

6. The one or more non-transitory machine readable information storage mediums of claim 5, wherein the plurality of pose vectors comprises translation and rotation information of the imaging device.

7. The method of claim 1, wherein a pixel with large photometric error maps to a smallest confidence value, wherein the pixel with small photometric error maps to a larger confidence value.

8. The system of claim 3, wherein a pixel with large photometric error maps to a smallest confidence value, wherein the pixel with small photometric error maps to a larger confidence value.

* * * * *